United States Patent [19]
Pircher et al.

[11] Patent Number: 6,002,098
[45] Date of Patent: Dec. 14, 1999

[54] LASER-ASSISTED PLATING OF STRIP

[75] Inventors: Hans Pircher, Mülheim; Rudolf Kawalla, Bottrop; Reinhard Poprawe, Aachen; Gerd Susek, Mülheim, all of Germany

[73] Assignee: Thyssen Stahl Aktiengesellschaft, Duisburg, Germany

[21] Appl. No.: 08/875,676

[22] PCT Filed: Jan. 23, 1996

[86] PCT No.: PCT/EP96/00263

§ 371 Date: Jan. 2, 1998

§ 102(e) Date: Jan. 2, 1998

[87] PCT Pub. No.: WO96/22855

PCT Pub. Date: Aug. 1, 1996

[30] Foreign Application Priority Data

Jan. 25, 1995 [DE] Germany .......................... 195 02 140

[51] Int. Cl.[6] .................................................. B23K 26/00
[52] U.S. Cl. .................................. 219/121.64; 219/121.85
[58] Field of Search .......................... 219/121.64, 121.85; 427/556, 597; 148/525; 156/272.8

[56] References Cited

U.S. PATENT DOCUMENTS

| | | | |
|---|---|---|---|
| 3,417,223 | 12/1968 | Steigerwald | ........................ 219/121.14 |
| 3,795,971 | 3/1974 | Chivinsky . | |
| 4,260,095 | 4/1981 | Smith . | |
| 4,423,120 | 12/1983 | Paulus et al. . | |
| 4,471,204 | 9/1984 | Takafuji et al. . | |
| 4,559,089 | 12/1985 | Dromsky et al. . | |
| 4,826,736 | 5/1989 | Nakamura et al. . | |
| 4,912,297 | 3/1990 | Beyer et al. . | |
| 5,170,031 | 12/1992 | Russell et al. . | |
| 5,306,890 | 4/1994 | Minamida et al. . | |

FOREIGN PATENT DOCUMENTS

| | | |
|---|---|---|
| 0 205 183 A2 | 12/1986 | European Pat. Off. . |
| 2 328 543 | 5/1977 | France . |
| 38 27 297 | 2/1990 | Germany . |
| 58-65590 | 4/1983 | Japan . |
| 61-276787 | 12/1986 | Japan . |
| 63-63586 | 3/1988 | Japan . |
| 63-290694 | 11/1988 | Japan . |
| 1-122678 | 5/1989 | Japan . |
| 2-46983 | 2/1990 | Japan . |
| 2-99284 | 4/1990 | Japan . |

*Primary Examiner*—Gregory Mills
*Attorney, Agent, or Firm*—Proskauer Rose LLP

[57] ABSTRACT

Process for the joining of strips and/or sheets of metallic materials, wherein the strips/sheets are introduced converging on one another at an angle into a roll nip, the surfaces coming into contact with one another being heated, but not melted by a laser beam immediately prior to physical contact and the strips/sheets being so pressed together in a directly following joining pass that they are rigidly connected to one another at material surfaces brought into contact.

27 Claims, 3 Drawing Sheets

LASER-ASSISTED PLATING OF STRIP

BACKGROUND OF THE INVENTION

The invention relates to a process for the joining of strips and/or sheets of metallic materials, wherein at least two strips and/or sheets are introduced offset from one another with reference to their longitudinal axes and overlapping one another and converging on one another at an acute angle into a roll nip and are pressed on to one another in a roll pass, so that they are completely or partially rigidly connected to one another at their surfaces brought into contact.

Processes of the kind specified are used, for example, to provide steel sheets with metal coatings. Such coatings are used for protection against corrosion and wear, to enhance surface hardness, give a more decorative appearance, to improve sliding properties or for the application of material to places liable to wear. The coatings can have different thicknesses, in dependence on the process and the materials used.

In a prior art process of the kind specified, namely a cold pressure welding process, soft unalloyed steel or stainless steel is given a cladding with aluminium, copper or brass by cold rolling. As a rule thin strips or sheets up to thicknesses around 4 mm are obtained. To obtain a satisfactory connection between the different metals, reshaping is required in the contact zone. Such reshaping opens up oxide layers or surface films, so that metals not yet exposed to the surrounding atmosphere are connected to one another. This so-called cladding lamination requires a threshold change of shape of usually at least 30% in one cold rolling pass. For this purpose high rolling forces must be used. Heavy demands are also made on the surfaces in the cladding zone; these must be previously suitably cleaned. As a result, the process is expensive in technical apparatus. Moreover, the combinations of materials suitable for cold rolling cladding are limited (Journal "Aluminium", 56, 1980.2, pages 147/149).

Another known cold pressure welding process is the explosive cladding of unalloyed, low-alloyed or stainless steel with other metallic materials. A cladding of various materials is applied directly or via intermediate layers. Explosive claddings usually have thicknesses above 4 mm. One example is the explosive-clad transition members (transition joints) for welded connections between constructional steel and the fairly high-strength aluminium alloy AlMg 4.5, which must be carried out using an intermediate layer of Al 99.5, to achieve those utilization properties which are required of fusion welding connections with transmission of force perpendicularly to the plane of the cladding. In this process the advantage of a certain independence as regards the combinations of materials is offset by the disadvantage that a number of layers must be joined. This kind of strip production is therefore also bound up with the presence of expensive devices Journal "Aluminium", 56, 1980.2, pages 147/149).

It is also known to connect steel and aluminium to one another by fusion welding. Conventional welding processes are used such as the TIG or the MIG process. In any case the process is so performed that only aluminium in the liquid state is present in the roil nip. A disadvantage of this process is that at the boundary layer of the two materials an intermetallic connection is formed which is the weakest point of the welded connection (Journal "Aluminium", 56, 1980.2, pages 147/149).

In another known Joining process, also a fusion welding, the energy required for melting is introduced into the roll nip by means of a laser beam. In this known process both the carts to be joined are melted. If in this process aluminium and steel are to be connected to one another, the same problems probably arise as in the case of the other melting processes (DE 37 13 975 A1).

Lastly, a process is known for guiding metal strips together wherein the two strips are introduced converging on one another into a roll nip and are pressed on to one another in a roll pass, so that they are rigidly connected to one another at their surfaces brought into contact. Immediately prior to physical contact in the roll nip, the strips to be brought into contact are heated by a laser beam, the heated zone being either melted or merely heated to a diffusion temperature (U.S. Pat. No. 4,471,204). However, according to that prior art the two strips to be guided together are laterally offset in relation to their axes and overlap one another. In such cases there is a risk that the softer strip will be squashed in the projecting zone in the roll nip.

It is an object of the invention to provide a process for the connection of overlaoding strips of different metallic materials of difficult fusion meltability, if any, which is less expensive than the aforementioned process and wherein no squashing takes place of the overlapping zone of the strip or sheet of a softer material.

SUMMARY OF THE INVENTION

This problem is solved by the feature that at least one sheet and/or strip of the sheets/strips to be brought into contact is completely or partially heated, but not melted by a laser beam on its surface immediately prior to physical contact in the roll nip, unless strips or sheets are involved which have low-melting surfaces (such as, for example, zinc in the case of galvanized sheets), and also by the feature that the shearing-off of the softer sheet/strip in the overlap zone is prevented by counterpressure. More particularly the necessary counterpressure is exerted by underlay strips or a suitably calibrated roll on the side of the stronger sheet/strip.

The avoidance of the melting of the strips or sheets, which have no low-melting metal surface, such as zinc, zinc alloys, aluminium or copper, more particularly steel sheets coated therewith, is of considerable importance, since melting followed by solidification may produce hard and therefore brittle material phases which have a very adverse effect on the strength of the connection. It one of the strips/sheets to be connected is a thin steel sheet with zinc or zinc alloy coatings, although it is true that due to the lower melting point of said surfaces, mixing reactions, more particularly with aluminium and aluminium alloys may take place partially via molten phases, nevertheless even in these cases there is no occurrence, with practically identical joining parameters, of disadvantageous consequences for properties of utilization, more particularly no embrittlements, which have a disadvantageous effect on the shaping behaviour of the joined connection.

To enable the energy introduced to be available in full for activation on the surface, so that it is not passed on to the interior of the sheet or strip and increases the deformability of the part over its whole thickness, the laser beam should act on the sheet as close as possible to the physical place of contact between the sheets/strips to be connected. Due to the heating of the sheets/strip on its surfaces prior to entry into the roll nip, the topmost surface films or oxide layers of the materials break up at even lower pressure than in conventional processes, so that an adhesive connection can be produced more quickly than in the cold state. As a result, either the strength of the connection of the material surfaces is increased at a rolling pressure which remains constant in comparison with conventional cold pressure welding process, or else a substantially tower pressure is required to achieve a predetermined strength. Typically, a total reduction of thickness of 0.3% to 30% is enough to achieve a firmly adhering connection.

In the process the strips or sheets are connected to one another parallel with their longitudinal axis, the joint optionally taking the form of a parallel joint or an overlap joint. The process can be particularly advantageously used for joining steel to aluminium or aluminium alloys, copper or copper alloys, more particularly brass.

The use of the invention in motor car construction is particularly important. Sheet metal parts of the carcass optimized for weight and utility are produced by the combination of different materials and sheet metal thicknesses by the technology of "tailored blanks". The invention leads to a next generation of tailored blanks, by which not, only can different steel materials of different thicknesses be processed in a tailored blank, but a flange of some other material can also be welded on. The joining process, as in the case of tailored blanks, is performed on the flat metal sheet. Only after the deep drawing process is the three-dimensional shaped flange produced, to which a direct connection can be made during assembly.

In another embodiment, when transition joints have been inserted in tailored blanks, further sheets of the second material are joined on, including ones with different thicknesses. This way it is possible to produce tailored blanks directly from different metals, for example, steel and aluminium.

The required laser power need not be very high; an energy density of preferably less than 3 kWh/m$^2$ is enough to activate the surfaces thermally. More particularly $CO^2$ lasers solid-state or diode laser arrays can be used.

In the testing of the process another important advantage was found to be that the scale-free surfaces of the sheets/strips to be connected are not only dry and grease-free, but moreover they require no expensive mechanical cleaning by brushing or grinding.

To satisfy the low demands on the cleanness of the material surfaces, it is recommended that said surfaces acted upon by the laser beam should be protected against oxidation by a protective gas, more particularly by inert gases such as argon or nitrogen, prior to physical contact.

In another advantageous feature of the process, use is made of a laser beam linearly focused parallel with the roll nip. Its width of focus enables the width of the joining zone to be precisely determined with a geometrically rigid arrangement and continuous or pulsed coupling of the laser beam. The width of the joining zone can be extended by the laser beam focused on the roll nip being repeatedly moved parallel therewith, more particularly by a scanning system.

The resulting material composite can be after-treated in various ways. For example, the resulting material composite can in a following roll pass undergo a further reduction of thickness by cold rolling, or it can be converted to a state of improved shapeability by annealing.

The above, and the other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
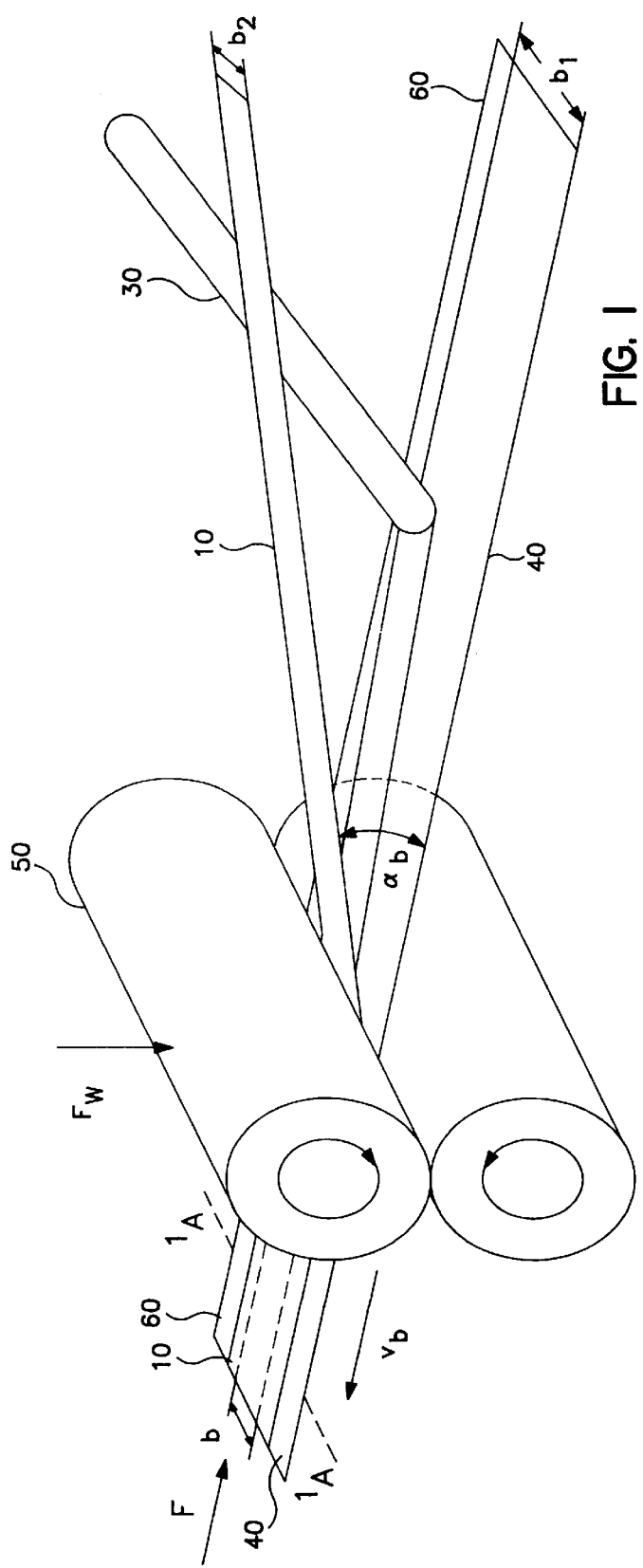
FIG. 1 is a perspective view of the method for laser-boosted cladding of metal strips or sheets in accordance with an embodiment of the invention for forming an overlap joint.
Figure 1A:
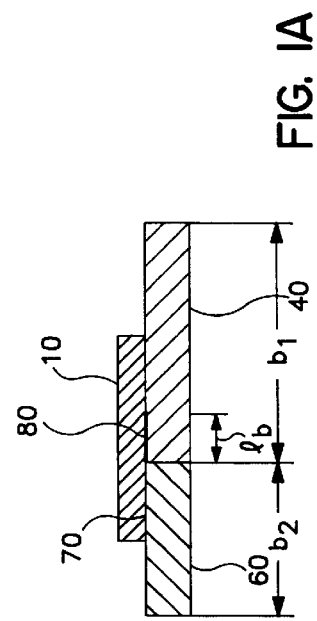
FIG. 1A is a cross-sectional view taken along line A—A of FIG. 1.

FIG. 1 and FIG. 1A show the joining process of two sheets i.e. a base material 40 and a cladding strip 10, as an overlapping joining zone 80 and an overlap zone 70 where the cladding strip 10 extends beyond the base material 40 as an overlap joint. To this end the base material 40, with an underlay strip 60 having essentially the same thickness and under lying parallel in the same plane, as the phase material 40 and under the cladding material 10, which is placed on a base material 40 and a underlay strip 60, are introduced into the roll nip 50 at an acute angle. A surface of the base material 40 is heated to a non-melting temperature by a laser beam 30 immediately prior to converging with metallic cladding strip 10. The underlay strip 60 and the base material 40 support the cladding material 10 over its whole width in the roll nip. A counter pressure is exerted by the underlay strip 60 on the overlap zone 70 of the cladding material 10 which extends beyond the base material 40 thereby preventing the overlap zone 70 from being squeezed off at edge.

The laser beam 30 is focussed parallel with the plane of the joint gap. Operations can be performed with a beam polarized parallel with or perpendicular to the plane of incidence. A parallel-polarized beam enables operations to be performed with lower energy densities. Basically the axis of the linearly focused laser beam lies centrally in the joint gap; however, it can be displaced slightly towards the material of lower strength. The energy density to be selected for the two materials depends on the materials and the speed of feed. Basically, as regards energy density distribution, the material of higher strength is acted upon with a lower energy density. Satisfactory results have been opatained with an energy density distribution of 30 to 45% on steel and 55 to 70% an aluminium.

Figure 2:
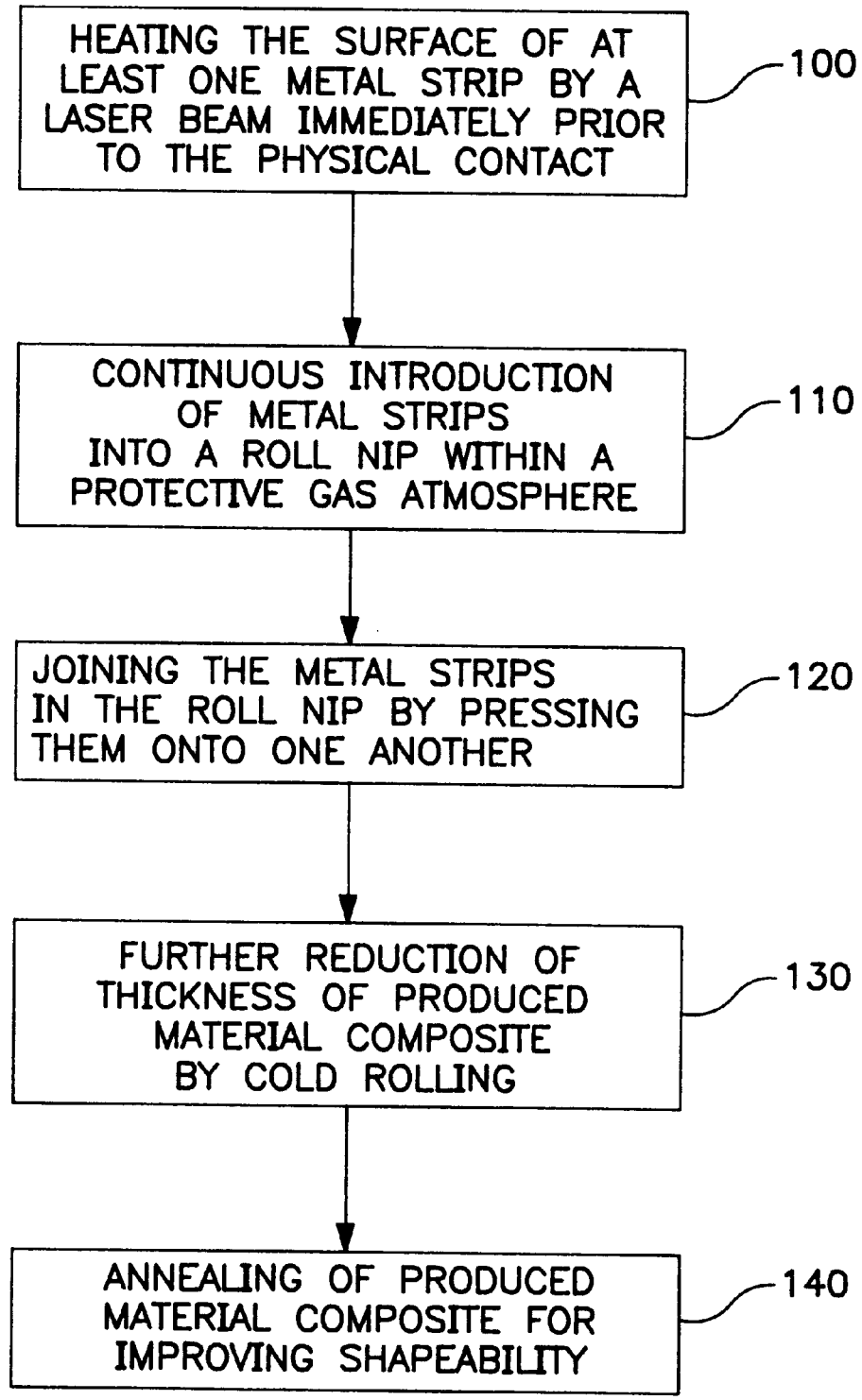
FIG. 2 is a flow chart of the method for laser-boosted cladding of metal strips or sheets in accordance with an embodiment of the invention.
Figure 3:
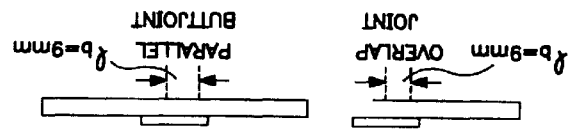
FIG. 3 is a table listing typical process parameters for parallel joint connection and for an overlap joint connection.

FIG. 2 is a flow chart showing the basic steps of the process including heating the base material (block 100), introducing the base material and the cladding strip into the roll nip (block 110), joining the bade material and the cladding strip by pressing them together in the roll nip (block 120), cold rolling (block 130), and annealing (block 140).

| | | |
|---|---|---|
| rolling force | $F_w$ | kN |
| total degree of deformation | $\epsilon_h$ | % |
| total thickness prior to rolling | $h_0$ | mm |
| total thickness after rolling | $h_1$ | mm |
| cladding thickness prior to rolling | $h_{0A}$ | mm |
| cladding thickness after rolling | $h_{1A}$ | mm |
| pressed length | $l_d$ | mm |
| laser focus width (=width of adhesion) | $l_b$ | mm |
| strip feed | $v_b$ | mm/min |
| laser power | $P_{cw}$ | kW |
| rolling pressure | P | kN/mm$^2$ |
| energy density | $E_F$ | kWh/m$^2$ |
| strip width base material | $b_1$ | mm |

-continued

| strip width cladding | $b_2$ | mm |
|---|---|---|
| roll diameter | D | mm |

$$\varepsilon_h = \frac{h_0 - h_1}{h_0}$$

$$P = \frac{F_w}{I_d * b_2}$$

$$E_F = \frac{P_{cw} * 100}{6 * I_b * v_b}$$

$$I_d = \sqrt{D/2 * (h_{0A} - h_{1A})}$$

Keys to table on page 10

Laser-Boosted Cladding of Strip—Embodiments
A=Test; B=combination of materials; C=base material; D=cladding; E=width of the material for rolling; F=thickness prior to rolling: G=total; H=thickness following rolling; I=rolling force; J=degree of deformation; K=pressed length; L=strip feed; M=rolling pressure; N=energy density; O=parallel joint; P=overlap joint.
Z=hot galvanized
ZF:=galvanically annealed
ZE=electrolytically galvanized
(Footnotes):
*) mean value of metallographically determined thicknesses
**) 29 mm partial strip removed after cladding roll diameter: 150 mm
width of bonding zone: 10 mm=width of focus

We claim:

1. A process for joining a first metallic sheet to a second metallic sheet, comprising:
    heating at least a portion of said first metallic sheet which is substantially free of low-melting metallic surfaces with a laser beam to a non-melting temperature immediately prior to introducing said first metallic sheet into a roll nip thereby to form a joining zone on said first metallic sheet;
    introducing said first metallic sheet and said second metallic sheet into said roll nip at an acute angle to each other and offset with respect to their longitudinal axes such that said second metallic sheet overlaps said joining zone and a portion of said second metallic sheet forms an overlap zone which extends beyond a width of said first metallic sheet, said first metallic sheet and said second metallic sheet being pressed against one another with a predetermined pressure in a roll pass of said roll nip so they are joined along said joining zone; and
    exerting a counter pressure against the overlap zone of said second metallic sheet in said roll pass to prevent shearing off of said overlap zone.

2. A process according to claim 1, wherein the laser beam has an energy density less than about 3 kWh/M$^2$ in a zone of the surface portion heated by the laser.

3. A process according to claim 1, wherein said counter pressure is applied by an underlay sheet located adjacent to said first metallic sheet and positioned against said overlap zone of said second metallic sheet.

4. A process according to claim 1, wherein said counter pressure is applied by a suitably calibrated roll located adjacent to said first metallic sheet and positioned against said overlap zone of said second metallic sheet.

5. A process according to claim 1, wherein said step of heating is performed in a protective atmosphere for preventing oxidation of the joining zone prior to said step of introducing.

6. A process according to claim 1, wherein said laser beam is linearly focusable parallel with the roll nip, a width of focus of said laser beam determining a width of the joining zone.

7. A process according to claim 1, wherein said step of heating includes scanning the laser beam parallel with the roll nip, a scanning width of said laser beam determining a width of the joining zone.

8. A process according to claim 1, wherein the laser beam is pulsed.

9. A process according to claim 1, wherein the laser beam is continuous.

10. A process according to claim 1, further comprising:
    cold rolling said first and second metallic sheets following a mutual joining thereof by said roll pass.

11. A process according to claim 1, further comprising:
    annealing said first and second metallic sheets following a mutual joining thereof by said roll pass.

12. A process according to claim 1, wherein said sheets are comprised of at least one material selected from the group consisting of steel, aluminum, copper and brass.

13. A process according to claim 1, wherein at least one of said sheets is a metallic strip.

14. A process for joining a first metallic sheet to a second metallic sheet, comprising:
    heating at least a portion of said first metallic sheet which includes a low-melting metallic surface with a laser beam to a temperature sufficient to melt said low-melting surface but not a remainder of said first metallic sheet immediately prior to introducing said first metallic sheet into a roll nip thereby to form a joining zone on said first metallic sheet;
    introducing said first metallic sheet and said second metallic sheet into said roll nip at an acute angle to each other and offset with respect to their longitudinal axes such that said second metallic sheet overlaps said joining zone and a portion of said second metallic sheet forms an overlap zone which extends beyond a width of said first metallic sheet, said first metallic sheet and said second metallic sheet being pressed against one another with a predetermined pressure in a roll pass of said roll nip so they are joined along said joining zone; and
    exerting a counter pressure against the overlap zone of said second metallic sheet in said roll pass to prevent shearing off of said overlap zone.

15. A process according to claim 14, wherein said low-melting surface is a low-melting metallic coating.

16. A process according to claim 14, wherein the laser beam has an energy density less than about 3 kWh/M$^2$ in a zone of a surface portion heated by the laser.

17. A process according to claim 14, wherein said counter pressure is applied by an underlay sheet located adjacent to said first metallic sheet and positioned against said overlap zone of said second metallic sheet.

18. A process according to claim 14, wherein said counter pressure is applied by a suitably calibrated roll located adjacent to said first metallic sheet and positioned against said overlap zone of said second metallic sheet.

19. A process according to claim 14, wherein said step of heating is performed in a protective atmosphere for preventing oxidation of the joining zone prior to said step of introducing.

20. A process according to claim 14, wherein said laser beam is linearly focusable parallel with the roll nip, a width of focus of said laser beam determining a width of the joining zone.

21. A process according to claim 14, wherein said step of heating includes scanning the laser beam parallel with the roll nip, a scanning width of said laser beam determining a width of the joining zone.

22. A process according to claim 14, wherein the laser beam is pulsed.

23. A process according to claim 14, wherein the laser beam is continuous.

24. A process according to claim 14, further comprising:
cold rolling said first and second metallic sheets following a mutual joining thereof by said roll pass.

25. A process according to claim 14, further comprising:
annealing said first and second metallic sheets following a mutual joining thereof by said roll pass.

26. A process according to claim 14, wherein said sheets are comprised of at least one material selected from the group consisting of steel, aluminum, copper and brass.

27. A process according to claim 14, wherein at least one of said sheets is a metallic strip.

* * * * *